United States Patent [19]

Hegler et al.

[11] Patent Number: 5,393,211
[45] Date of Patent: Feb. 28, 1995

[54] APPARATUS FOR THE MANUFACTURE OF A PLASTIC PIPE HAVING TRANSVERSE PROFILE FEATURES

[75] Inventors: Ralph-Peter Hegler, Bad Kissingen; Wilhelm Hegler, Goethestrasse 2, D-8730 Bad Kissingen, both of Germany

[73] Assignee: Wilhelm Hegler, Bad Kissingen, Germany

[21] Appl. No.: 96,474

[22] Filed: Jul. 22, 1993

[30] Foreign Application Priority Data

Jul. 24, 1992 [DE] Germany .............. 4224514

[51] Int. Cl.⁶ .............. B29C 33/24; B29C 53/30; B29D 23/18
[52] U.S. Cl. .............. 425/149; 264/40.5; 264/209.3; 264/286; 264/508; 425/150; 425/325; 425/336; 425/392; 425/396; 425/532; 425/539
[58] Field of Search .............. 425/133.1, 149, 326.1, 425/336, 387.1, 388, 393, 396, 150, 325, 392, 532, 539; 264/508, 209.3, 286, 40.5

[56] References Cited

U.S. PATENT DOCUMENTS

| | | | |
|---|---|---|---|
| 3,751,541 | 8/1973 | Hegler | 425/396 |
| 3,776,679 | 12/1973 | Hegler | 425/326.1 |
| 3,981,663 | 9/1976 | Lupke | 425/396 |
| 4,789,322 | 12/1988 | Chan et al. | 425/396 |
| 4,824,354 | 4/1989 | Keaton | 425/345 |
| 4,900,503 | 12/1990 | Hegler et al. | 264/508 |

FOREIGN PATENT DOCUMENTS

| | | |
|---|---|---|
| 0240838 | 10/1987 | European Pat. Off. . |
| 0359088 | 3/1990 | European Pat. Off. . |
| 3810915 | 4/1989 | Germany . |
| 971021 | 9/1964 | United Kingdom . |

OTHER PUBLICATIONS

Kunststoffe, vol. 61, 1971, Issue 4, "Anlagen zum Kontinuierlichen Herstellen von Sandwich–Elementen und ähnlichen Halbzeugen aus Polyurethan–Schaumstoffen".

Primary Examiner—Jay H. Woo
Assistant Examiner—Joseph Leyson
Attorney, Agent, or Firm—Laff, Whitesel, Conte & Saret, Ltd.

[57] ABSTRACT

An apparatus for the manufacture of pipes having transverse profile features has a machine bed, on which half shells, which can be combined to form a mold, are rotatably and displaceably drivable. The half shells are pressed together on a molding path by guide rails, of which one is displaceable at right angles to the direction of production by hydraulically actuatable drives. Interlockings may be provided in addition, a locking member of which engaging with an associated locking recess.

5 Claims, 3 Drawing Sheets

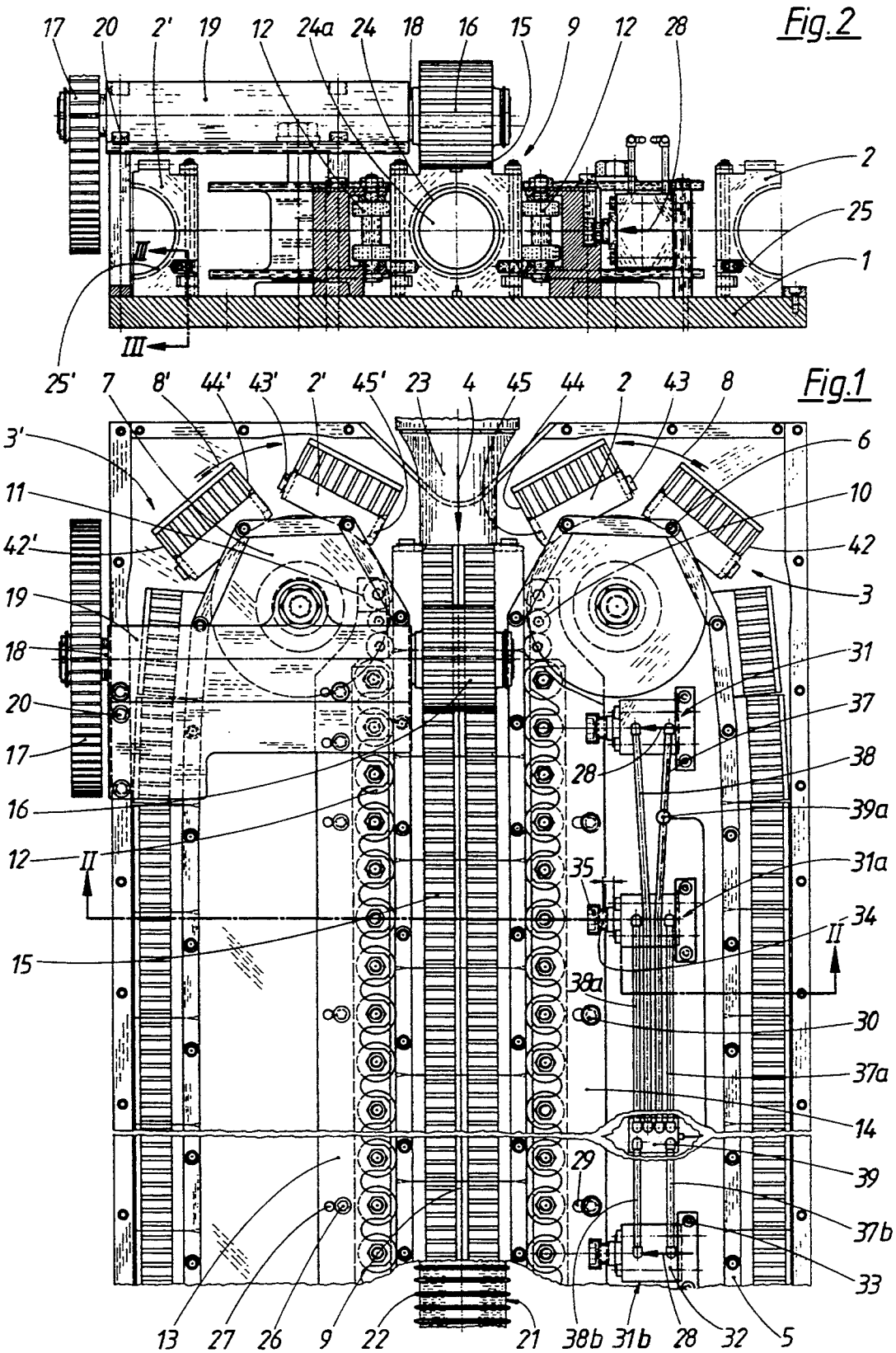

APPARATUS FOR THE MANUFACTURE OF A PLASTIC PIPE HAVING TRANSVERSE PROFILE FEATURES

BACKGROUND OF THE INVENTION

1. Field of the Invention

The invention relates to an apparatus for the manufacture of a plastic pipe having transverse profile features.

2. Background Art

In an apparatus of the generic kind known from U.S. Pat. No. 4,900,503 the half shells arranged in continuous sequence one after the other are interconnected by means of fish plates to form a chain. At the beginning of the molding path, a driving pinion engages with a denticulation provided on the upper side of the half shells, the driving pinion simultaneously driving the half shells associated with each other in pairs. An injection head of an extruder is arranged before the molding path and injects a thermally plastic tube of plastic material into the molding chamber where, between a calibrating mandrel and mold recesses provided in the half shells, it is formed into a pipe having transverse profile features, for instance ribs. The mold recesses are acted upon by vacuum through vacuum lines formed in the half shells. They are connected to a negative pressure source by way of suction connections provided in the machine bed. The guide devices which press the half shells together on the molding path have guide rails arranged on both sides of the molding path and to which guide rollers are rotatably mounted, which in turn rest against the outside of the half shells. One guide rail is fixed to the machine bed, while the other guide rail is pressed by springs against the half shells passing though the molding path. This is necessary in order to ensure that the half shells adjoining in pairs mutually abut closely to each other. This basic structure of the apparatus has been known for a long time from U.S. Pat. No. 3,776,679.

Considerable changes of pressure between the calibrating mandrel and the half shells arise due to fluctuations in the performance of the extruder, changes in the viscosity of the plastic material as a result of variations of temperature in the extruder or as a result of fluctuating cooling conditions on the molding path and as a result of frequently changing quantities of plastic material needed for the manufacture of the pipe along a section in the length of the plastic pipe, for instance when a rib is formed or when smooth but rather thickwalled sockets or spigots are injection-molded. These fluctuations of pressure cannot be taken up by the springs mentioned which are commonly in the form of packages of pre-stressed disk springs.

To counter this problem it has become known from EP 0 359 088 A2 to provide a compensation chamber where the injection head passes into the calibrating mandrel and to fill it with a fluid under pressure which, in turn, can yield. Any excess plastic material may escape into this chamber. This implies considerable sealing problems.

In this connection, DE 38 10 915 C1 teaches to rigidly interlock the half shells abutting in pairs on the molding path, the interlocking being produced at the beginning of the molding path and released at the end of the molding path by corresponding stops being triggered.

EP 0 240 838 A2 teaches a fundamentally similar solution in which the half shells abutting in pairs on the molding path are mutually interlocked by conical pins engaging with the half shells. These pins are removed at the end of the molding path.

SUMMARY OF THE INVENTION

It is an object of the invention to embody an apparatus of the generic type such that, given a simple structure, high locking pressures can be exerted on the half shells in the area of the molding path, which, on the other hand, can be cancelled in a simple manner.

In accordance with the invention this object is attained by the following features:

A machine bed, half shells arranged on the machine bed and guided in two continuous series, a drive for the continuously revolving movement of the series of half shells, a molding path, on which in each case one half shell from each series form a pair and are driven by the drive in a direction of production, half shells located one behind the other in the direction of production closely resting with a first front end against a second front end of an adjacent half shell and defining a molding chamber, and guide devices laterally defining the molding path pressing the pairs of half shells together in a direction parallel to the machine bed and at right angles to the direction of production, at least one guide device being displaceably guided in a direction of displacement and being acted upon by pressure devices, wherein the pressure devices are hydraulically actuatable piston-cylinder drives.

The hydraulically actuatable piston-cylinder drives provided according to the invention are easy to be set and opened, they ensure extremely high locking pressures to be exerted and in particular the mold to be opened in an emergency. This solution is extraordinarily simple. Moreover, with the hydraulically actuatable piston-cylinder drives, the pressure and consequently the locking pressure working on the half shells can be changed continuously during operation. This is not possible where disk springs are used for the exertion of forces on a guide rail. Disk springs will require a short-term interruption of the production to allow setting of the pressing forces.

The mold being closed transversely of the direction of production and in parallel to the machine bed by the extremely high forces under regard results in an increase in the frictional forces on the molding path to be overcome by the drive—even when guide rollers are inserted between the half shells and the guide devices; this requires higher driving torques. This leads in turn to an increase of the tilting moments on the half shells directly driven at a time, there being the risk that half shells arranged one after the other in sequence are slightly displaced one relative to the other perpendicularly to the machine bed, i.e. in the vertical line, which brings along considerable disadvantages in quality of the tube to be produced. In practice, this is tried to be countered in that the half shells have a denticulation not only on their upper side, but also on their underside, with which a second pinion engages, whereby the danger of the tilting moments is at least reduced. The expense of this is great. Entire compensation of the tilting moments is not possible in this way either. This problem is countered by further inventive features, which positively prevents that half shells located on after the other in sequence change in level relative to each other. Although this solution very advantageously combines with the half shells being pressed together laterally according to the invention by means of the hydraulically actuatable piston-cylinder drives, it may of course also be used independently of this.

Further features, details and advantages of the invention will become apparent from the ensuing description of an example of embodiment taken in conjunction with the drawing.

BRIEF DESCRIPTION OF THE DRAWING

FIG. 1 is a plan view of an apparatus for the manufacture of plastic pipes,

FIG. 2 is a section through the apparatus according to section line II—II in FIG. 1.

DESCRIPTION OF THE PREFERRED EMBODIMENT

Figure 3:
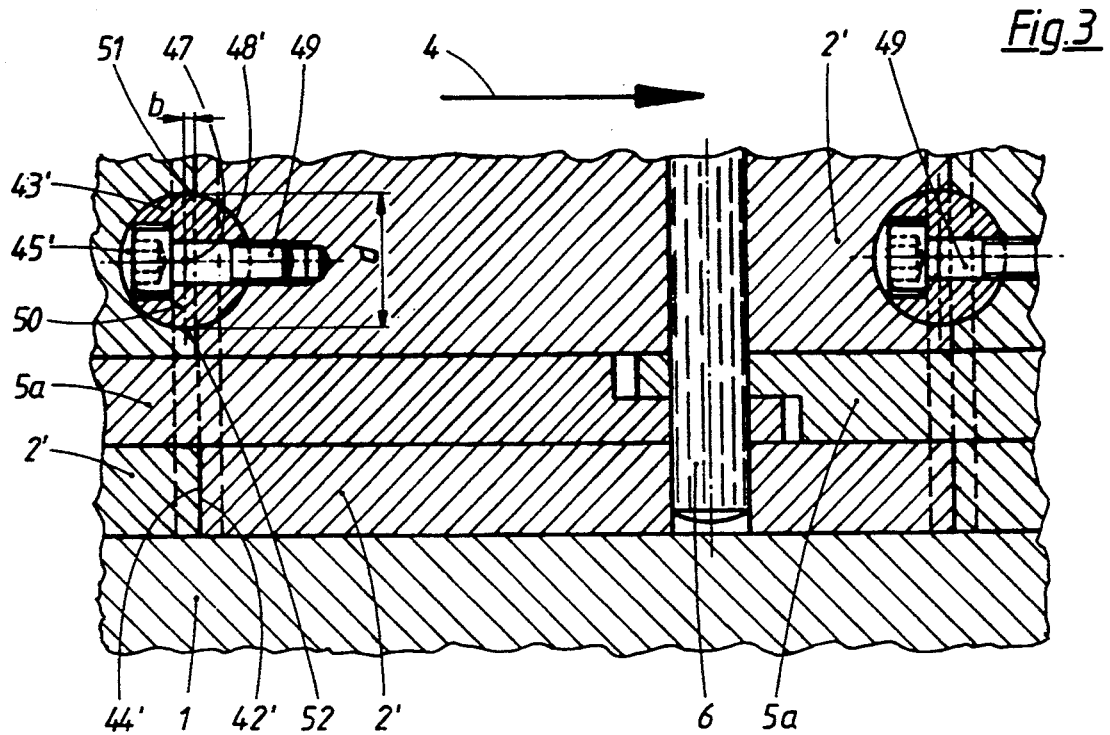
FIG. 3 is a partial section according to the section line III—III in FIG. 2.
Figure 4:
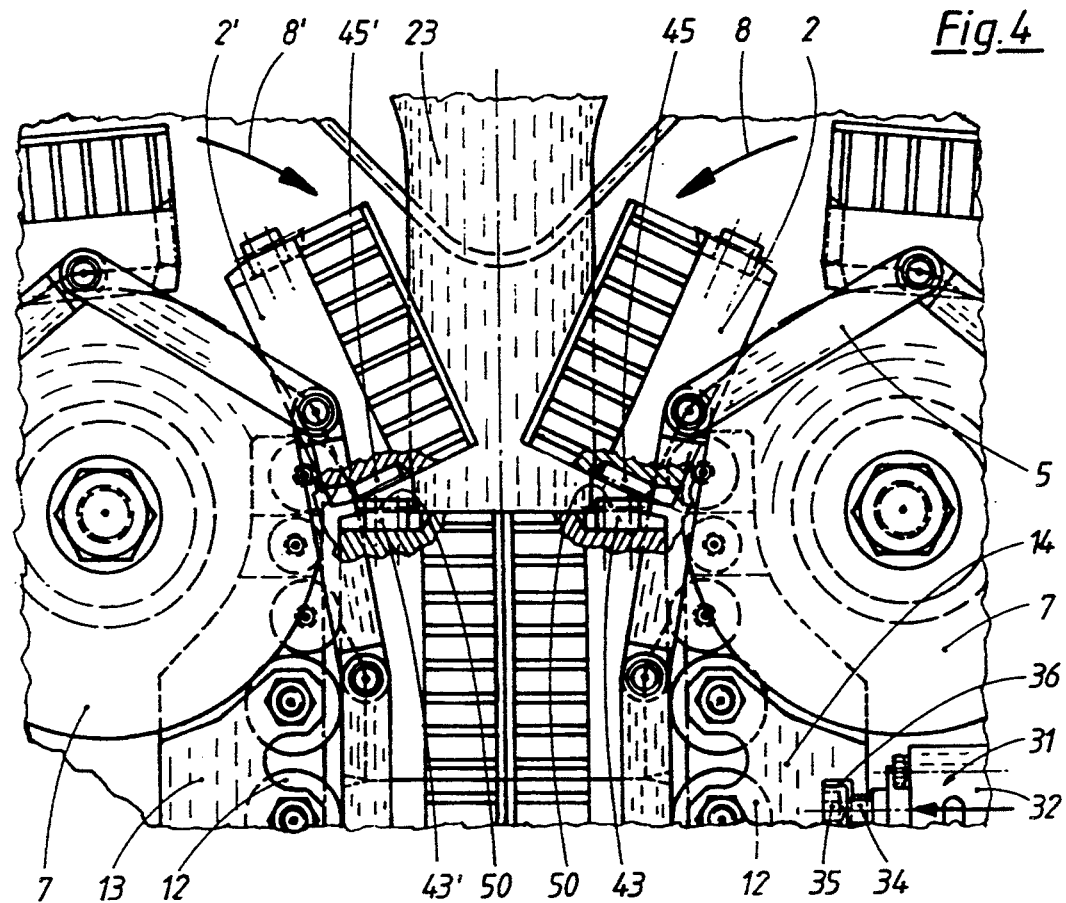
FIG. 4 is a partial plan view of the apparatus with two half shells being swung into the molding path.

As seen in FIGS. 1 and 2, an apparatus for the manufacture of plastic pipes having transverse profile features comprises a machine bed 1, on which half shells are arranged, which are joined together respectively in two so-called chains 3, 3'. For this purpose, fish plates 5, 5a are coupled by means of a coupling bolt 6 to each half shell 2, 2' in the outer region thereof and downstream thereof with respect to the direction 4 of production, each fish plate 5, 5a being attached to the succeeding half shell 2, 2' at the corresponding position, likewise by means of another coupling bolt 6. The chains 3, 3' thus formed, at their rear end with respect to the direction 4 of production, are carried around guide wheels which serve as and may be designated feed rollers 7. The individual half shells 2, 2' are swung into a molding path 9 by the revolution of the chains 3, 3' in the direction of the arrows 8, 8'. In this path 9, two half shells 2, 2' at a time are united to a half shell pair, so that an unbroken succession of pairs of half shells mutually abut in the direction 4 of production. In order to achieve rapid closure of the half shells 2, 2' into a parallel and adjoining orientation, so-called steering rollers 10 and closing rollers 11 are provided, which bring the rear ends of the half shells 2, 2', referred to the direction 4 of production, together in an accelerated fashion.

In the molding path 9 itself the mutually abutting half shells 2, 2' are pressed together by means of guide rollers 12. These are positioned in straight series, referred to the direction 4 of production, one after the other in a guide rail 13 or a guide rail 14. At the front end, referred to the direction 4 of production, of the machine bed 1, which is not shown in FIG. 1, return rollers, likewise serving as guide wheels, are rotatably mounted, around which the chains 3, 3' are guided and returned to the feed rollers 7, as is generally known with this type of machines and as is illustrated and described for instance in U.S. Pat. No. 4,900,503.

On the upper side of the half shells 2, 2' a set of teeth 15 is provided, the two sets of teeth 15 of the half shells 2, 2' which are arranged in abutting pairs being in alignment, so that a common pinion 16 can engage in the teeth 15 from above and push the half shells 2, 2' along the molding path 9 as a closed mold. This drive pinion 16 is driven in a customary way by a motor (not shown) through a drive wheel gear 17 which is fixedly mounted on a shaft 18 which in turn bears the pinion 16 fixedly mounted on it. The shaft 18 is housed in a bearing 19 which is supported on the machine bed 1 and is firmly connected with the latter by means of screws 20.

Plastic pipes 21 having transverse profile features, i.e. ribs 22 or grooves extending around their girth, are manufactured on the apparatus illustrated. To this end an extruder is provided of which only the injection head 23 is outlined, from which a tube 23a—roughly outlined in FIG. 5—is extruded which, in a thermally plastic condition, enters into the mold formed on the molding path 9, in which mold the formation among others of the ribs 22 takes place by the mold chamber 24 formed on the molding path 9 being acted upon by vacuum. The mold recesses 25, 25' spared in the half shells 2, 2' for the formation of a molding chamber 24 have a shape that is complementary to the outside shape of the pipe 21. By means of vacuum lines (not shown) they are connected to a negative pressure source, as illustrated and described in detail in U.S. Pat. No. 4,900,503 already mentioned. From this publication, to which explicit reference is made in this regard, it is also known to provide a calibrating mandrel 24a in the molding chamber 24 at the beginning of the molding path, i.e. following the injection head 23; the plastic pipe 21 to be produced is given its shape, inclusive for instance of ribs 22, between the calibrating mandrel 24a and the mold recesses 25, 25'. High pressures may occur between this calibrating mandrel 24a and the half shells and can cause the half shells 2, 2' abutting in pairs to be pressed together.

The guide rail is tightly connected with the machine bed 1 by means of screws 26, there being the possibility that additional holes 27 are provided in the guide rail 13 in order to fundamentally ensure the shifting of the guide rails and their being again tightly mounted for any change in the size of the half shells 2, 2'. As long as half shells 2, 2' of constant external dimensions are used, there is no shifting of this guide rail 13.

The other guide rail 14—shown on the right in FIGS. 1 and 2—is displaceable on the machine bed 1 at right angles to the direction 4 of production, i.e. in the horizontal line. To this end it is provided with oblong holes 29 extending in the direction 28 of displacement which are passed through by guide rods 30 secured to the machine bed 1, so that the guide rail 14 is displaceable on these guide rods 30 in the direction 28 of displacement.

Three linear drives on the whole are fixed on the machine bed 1 in the form of hydraulically actuatable piston-cylinder drives 31, 31a, 31b, of which the cylinder 32 is secured to the machine bed by means of screws 33. Each of their piston rods 34 has a push button 35 on its free end which engages with a recess 36 in the guide rail 14 which is open to the top and T-shaped in cross-section. Depending on the direction of drive of the piston-cylinder drive 31, 31a, 31b, the guide rail may either be moved in the direction towards the half shells 2 or away from them. To this end the drives 31, 31a, 31b are formed as double-acting piston-cylinder drives, into which terminate two hydraulic lines 37, 38, 37a, 37b, 38a at a time which are collected at a central control valve block 39. The piston-cylinder drives 31, 31a, 31b are short-stroke drives of which the maximum stroke is in the range between 10 to 20 mm, as a rule 15 mm. Such a stroke is sufficient to ensure, in the case of malfunction due to overpressure in the mold, the mold to be opened by the control valve block 39 being triggered, the drives 31, 31a, 31b to be actuated and, consequently, the guide rail 14 to be moved backwards. To this effect a pressure transducer 39a is provided in the hydraulic line 37 and is connected to the control valve block 39.

Figure 6:
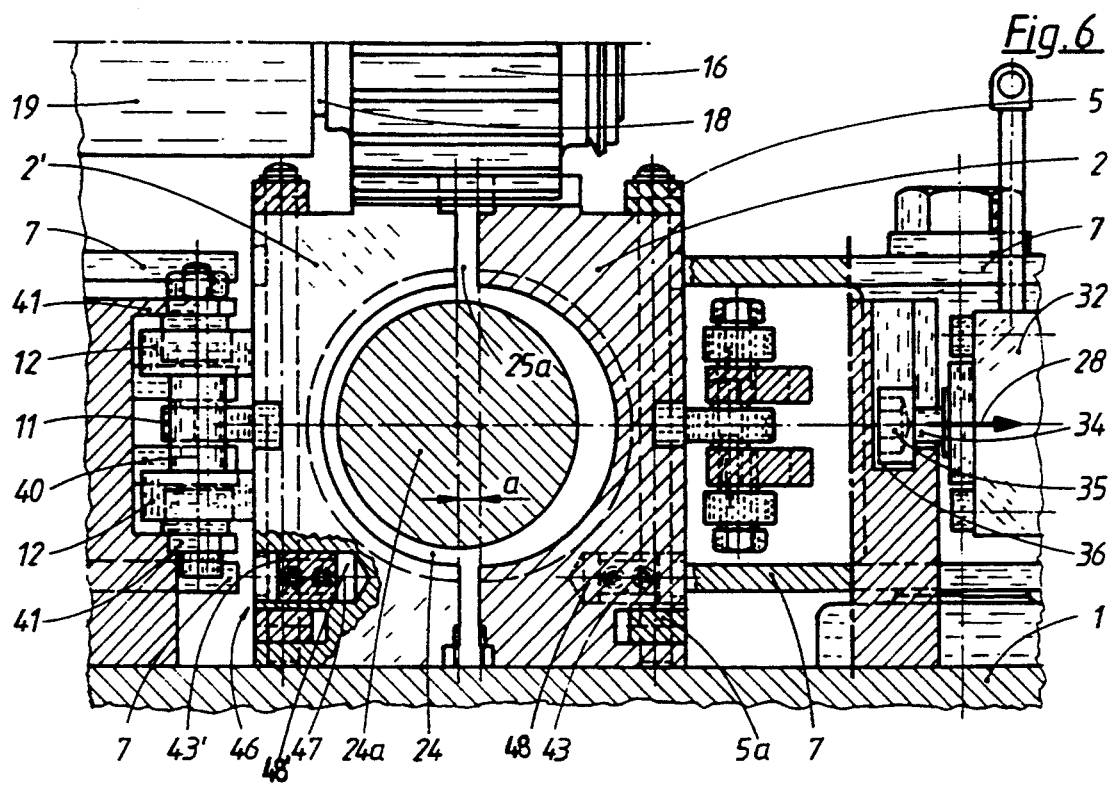
FIG. 6 is a vertical section through the apparatus according to the section line VI—VI in FIG. 5.
Figure 5:
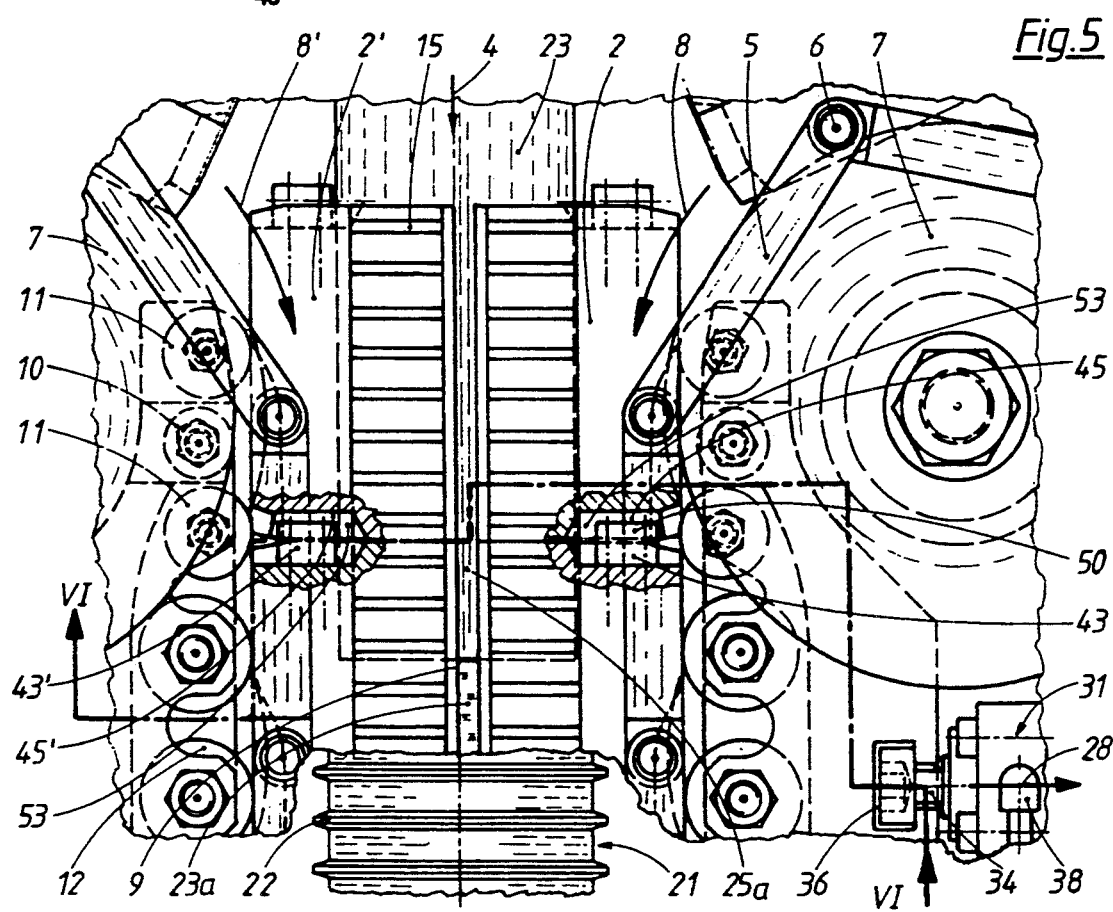
FIG. 5 is a partial plan view of the molding path after the half shells have been swung into the molding path.

An opening gap 25a with a gap width a of a few millimeters is visible in FIGS. 5, 6.

As seen in FIG. 1, the first piston-cylinder drive 31 seen in the direction 4 of production engages with the guide rail 14 in the vicinity of the first or the second closed pair of half shells 2, 2' directly after the feed rollers. The second drive 31a seen in the direction 4 of production engages with the guide rail 14 at a comparatively small distance from the first drive 31, namely approximately in the vicinity of the fourth pair of half shells 2, 2'. The third drive 31b seen in the direction of production 4 comes into engagement at a considerably greater distance. The arrangement of the plurality of the drive 31, 31a at the beginning of the molding path 9, namely in the vicinity of the calibrating mandrel 24a, is due to the fact that this is where the greatest pressures occur within the mold, whereas further to the back in the molding chamber 25 seen in the direction 4 of production, there are hardly any forces acting outwards. The drive 31b situated there primarily serves for displacement of the guide rail 14 parallel to itself. Since the forces acting on the guide rails 13, 14 can be comparatively great, it can be useful to connect the guide rails 13, 14 right across the half shells 2, 2' on the molding path 9 by a transverse beam which is connected with the machine bed 1 by means of tie rods. This would create a sort of a frame structure of a high rigidity of its own.

FIGS. 2 and 6 also show the way the guide rollers 12 are housed. They are arranged in pairs on an axis 40 and rest in bearing flanges 41 projecting from the respective guide rail 13 or 14.

A locking member 43 and 43' is provided on one front end 42 and 42' of each half shell 2 and 2', namely on the front end 42 and 42' following in the direction 4 of production. A locking recess 45, 45' matching the locking member 43, 43' is formed in the other front end 44, 44', advancing in the direction 4 of production, of each half shell 2, 2'. It is the purpose of the interlockings 46 thus formed to bring the half shells 2 and 2' following one after the other in a chain 3 and 3' into locking engagement at least on the molding path 9 in such a way that they are fixed in level relative to each other, i.e. in their position perpendicular to the plane of the machine bed 1.

The locking members 43 and 43' have the cross-section of a cylinder extending over more than 180° with a diameter d, their axis 47 extending at right angles to the direction 4 of production, parallel to the machine bed 1, i.e. in the direction 28 of displacement as seen in FIG. 6. They are arranged in an about semi-cylindrical accommodation 48 and 48', respectively, in the associated front end 42 and 42' and secured to the respective half shell 2 and 2' by countersunk screws 49, so that they project with a semi-cylindrical locking section 50 from each front end 42 and 42' following in the direction 4 of production. As seen in FIG. 3, the respective locking recess 45 and 45' combines with the respective accommodation 48 and 48' to form a cylinder, of which the axis coinciding with the respective axis 47 is situated slightly before the front ends 42 and 42' having the locking sections 50. This misalignment b of the axis 47 referred to the two front ends 42, 44 and 42', 44', which abut when the mold is closed, results in that the locking section 50 gets firmly braced with its bottom side and its upper side in the accommodating locking recess 45 and 45'. This results in that no vertical play occurs in the interlocking 46 even after prolonged operation. The misalignment b of the axis 47 referred to the front ends 42, 44, 42', 44' is very small. Referred to the diameter d of the locking members 43 and 43', the relation $12 < d/b < 15$ applies to it. In particular, $d/b \approx 14$ applies.

In the direction 28 of displacement, the locking sections 50 each have a clear play 53 in the respective locking recess 45 and 45', so that it is possible for the locking sections 50 to be entered into the respective locking recess 45 and 45' when the half shells 2 and 2' are swung into the molding path 9 without any damages occuring.

By means of the described interlocking 46, tilting moments are compensated which are exercised by the pinion 16 on the half shells 2, 2' with which it engages in each case. Consequently, any displacement in level of successive half shells 2 and 2' in relation to each other is precluded. The interlocking 46 is of special advantage for half shells 2, 2' for the manufacture of pipes 21 of a comparatively great diameter, such as pipes with a diameter from 200 mm onwards. It is absolutely reliable even when only one drive from above is used and, in particular, it does without the known use of a drive from above and a drive from below.

What is claimed is

1. An apparatus for the molding from a plastic tube (23a), a plastic pipe having transverse profile features, in particular ribs (22), comprising
   a machine bed (1) defining a horizontal plane,
   a first guide device (13) and a second guide device (14) arranged parallel to each other and to the horizontal plane and to a direction (4) of production, at least one of said first and said second guide device being displaceably guided in a direction (28) of displacement, which direction (28) of displacement is perpendicular to said direction (4) of production and parallel to the horizontal plane,
   pressure devices connected to said at least one of said first and second guide device and acting upon said at least one of said first and second guide device in the direction (28) of displacement,
   a molding path (9) defined between said first and said second guide device (13, 14), said molding path (9) having a first end and a second end,
   half shells (2, 2') arranged on the machine bed (1) in a first continuous series and a second continuous series, said second continuous series being arranged in mirror symmetry to said first continuous series with respect to the molding path (9) and the half shells (2, 2') arranged in the molding path (9) in the form of pairs, each pair consisting of one half shell (2) of said first continuous series and one half shell (2') of said second continuous series and several of such pairs arranged one behind another in said molding path (9) between said first and said second guide device (13, 14) and defining a molding chamber (24) for molding the plastic pipe and said half shells of one pair of half shells being pressed together by said guide devices,
   a drive arranged adjacent to said first end of said molding path (9) being in driving engagement with one pair of half shells (2, 2') to push said half shells (2, 2') from said first end to said second end of said molding path (9), means for guiding the half shells (2, 2') outside of said molding path (9) from said second end to said first end of the molding path (9), wherein the pressure devices are hydraulically actuatable piston-cylinder drives (31, 31a, 31b), connected by hydraulic lines (37, 38, 37a, 37b, 38a) to a control valve (39), and wherein control means are provided which upon overpressure in the molding chamber (24) trigger the control valve (39) to move said at least one of said guide devices (14) in the direction (28) of the displacement away from the molding path (9).

2. An apparatus according to claim 1, wherein the piston-cylinder drives (31, 31a, 31b) are double-acting piston-cylinder drives (31, 31a, 31b).

3. An apparatus according to claim 1, wherein the piston-cylinder drives (31, 31a, 31b) are in locking engagement with said at least one of said first and second guide device.

4. An apparatus according to claim 1, wherein the piston-cylinder drives (31, 31a, 31b) are short-stroke drives with a stroke of 10 to 20 mm.

5. An apparatus according to claim 1, wherein the control means is a pressure transducer (39a) which is provided in one of the hydraulic lines and which is connected to the control valve (39).

* * * * *